(12) United States Patent
Rudkowski et al.

(10) Patent No.: US 7,696,490 B2
(45) Date of Patent: Apr. 13, 2010

(54) DEVICE FOR THE UV TREATMENT OF FLOWING FLUIDS

(75) Inventors: Jan Boris Rudkowski, Bielefeld (DE); Ludwig Dinkloh, Herford (DE); Dieter Neitemeier, Steinhagen (DE)

(73) Assignee: Wedeco AG, Dusseldorf (DE)

( * ) Notice: Subject to any disclaimer, the term of this patent is extended or adjusted under 35 U.S.C. 154(b) by 911 days.

(21) Appl. No.: 10/567,835

(22) PCT Filed: Jun. 29, 2004

(86) PCT No.: PCT/EP2004/007022

§ 371 (c)(1),
(2), (4) Date: Feb. 8, 2006

(87) PCT Pub. No.: WO2005/023717

PCT Pub. Date: Mar. 17, 2005

(65) Prior Publication Data

US 2006/0222576 A1    Oct. 5, 2006

(30) Foreign Application Priority Data

Aug. 13, 2003 (DE) ................................ 103 37 379

(51) Int. Cl.
*G01N 21/01* (2006.01)
(52) U.S. Cl. .................. 250/436; 250/373; 250/435; 250/428; 250/432 R; 210/745
(58) Field of Classification Search ............. 250/436, 250/435, 432 R, 428, 373; 210/745, 748
See application file for complete search history.

(56) References Cited

U.S. PATENT DOCUMENTS

| 4,336,223 | A | * | 6/1982 | Hillman | 422/24 |
| 5,019,256 | A | * | 5/1991 | Ifill et al. | 210/232 |
| 6,269,680 | B1 | * | 8/2001 | Prieve et al. | 73/23.21 |
| 6,459,087 | B1 | | 10/2002 | Kaas | |
| 7,427,763 | B2 | * | 9/2008 | Rudkowski | 250/435 |

FOREIGN PATENT DOCUMENTS

| DE | 297 07 052 | 12/1997 |
| WO | WO 01/17906 | 3/2001 |
| WO | WO 01/17907 | 3/2001 |
| WO | WO 01/96823 | 12/2001 |

* cited by examiner

*Primary Examiner*—Jack I Berman
*Assistant Examiner*—Hanway Chang
(74) *Attorney, Agent, or Firm*—RatnerPrestia

(57) ABSTRACT

A device for the UV treatment of fluids flowing in a flow channel, including a plurality of cylindrical low-pressure mercury UV emitters arranged in groups in the flow channel. The longitudinal axes of the UV emitters are disposed substantially parallel to one another such that the emitters of a given group are disposed in a plane. At least one elongated sensor arrangement monitors the operating state of the emitters, and is spaced from and parallel to one of the groups of the emitters. The sensor arrangement extends essentially transverse to the longitudinal axes of the emitters of the adjacent group, and is provided with a separate UV sensor for each emitter. At least one unit connected with the sensor arrangement controls and/or regulates the emitters.

8 Claims, 4 Drawing Sheets

DEVICE FOR THE UV TREATMENT OF FLOWING FLUIDS

This specification for the instant application should be granted the priority date of Aug. 13, 2003, the filing date of the corresponding German patent application 103 37 379.9 as well as the priority date of 29 Jun. 2004, the filing date of the corresponding International patent application PCT/EP2004/007022 filed 29 Jun. 2004.

BACKGROUND OF THE INVENTION

The present invention relates to a device for the UV treatment of flowing media, in particular to a device for the UV disinfection of drinking water or waste water.

Generic devices are known from the practice, for example from documents U.S. Pat. No. 5,368,826, U.S. Pat. No. 5,660,719, EP 068 7201 and WO 00/40511.

The general technical background of the present invention relates to UV disinfection systems. A distinction must firstly be drawn between UV disinfection systems comprising medium-pressure emitters, which are not the subject of the present invention, and systems of this type comprising low-pressure mercury UV emitters. The systems comprising medium-pressure emitters conventionally have few emitter units, which are distinguished by high UV radiation power with correspondingly increased electrical power consumption. As there are, in this case, only a few emitters, separate monitoring of each individual emitter is easily possible. In the case of medium-pressure emitters, the cost of this monitoring is low compared to other expenses and equipment costs.

A significantly larger number of emitters are used in systems comprising low-pressure emitters. Although these emitters respectively have lower UV radiation power, they require lower equipment costs than medium-pressure emitters and are also substantially more efficient, thus reducing operating costs. In some cases, systems of this type therefore comprise several hundred emitters, which are arranged as what is known as an array in one or more flow channels. These emitters are conventionally used and operated jointly when they are new. The service life of emitters of this type is approximately 8,000 to 9,000 operating hours, i.e. about one year. After this time, the radiation power has decreased to the extent that the emitters have to be exchanged. The emitted radiation power is monitored by UV sensors, which monitor either the entire array or individual selected modules or groups of the array, as in the above-mentioned documents U.S. Pat. No. 5,368,826, EP 068 7201 and WO 00/40511. These documents do not make provision for individual monitoring of all of the emitters. In practice, it is assumed that all of the emitters age uniformly.

U.S. Pat. No. 5,660,719 proposes one approach for monitoring individual emitters. In this device, a coil, which receives from the power supply the electromagnetic radiation of the emitter in operation and which is then separately evaluated, is allocated to each lamp. The emitted radiation intensity itself is also in this document measured via a single UV sensor for a plurality of emitters, so the intensity signal is provided only for the overall array, while the information from the operating voltage is provided for each individual lamp.

However, monitoring of the individual radiation power of each individual emitter is therefore possible only indirectly, as the supply voltage path does not provide a clear indication of the emitted UV radiation. It is therefore conceivable, for example, that, in the case of an electrical emitter, which is entirely intact from the point of view of gas inflation, the emitter tube or the cladding tube surrounding the emitter has only limited UV transparency and there is therefore less UV radiation available than is assumed according to the electrical parameters.

The object of the present invention is therefore to provide a device for the UV treatment of flowing media, in which the radiation power of many low-pressure mercury emitters is individually monitored.

SUMMARY OF THE INVENTION

This object is achieved by a device having a plurality of cylindrical low-pressure mercury UV emitters arranged in groups in the flow channel, wherein the longitudinal axes of the UV emitters are disposed substantially parallel to one another such that the emitters of a given group are disposed in a plane; at least one elongated sensor arrangement monitors an operating state of the UV emitters, with the sensor arrangement being spaced from and parallel to one of the groups of emitters; the sensor arrangement extends essentially transverse to the longitudinal axes of the UV emitters of the adjacent group, and is provided with a separate UV sensor for each emitter of that group; at least one unit is connected with the sensor arrangement for controlling and/or regulating the UV emitters.

The terms used for differentiation from the prior art will firstly be defined. The term "sensor means", as used below, refers to all sensors, including all of the transfer elements that are used, that are provided for purposes ranging from the detection of the UV radiation to the transmission of an electrical (optionally digital) signal to a control, adjustment or monitoring unit. The term "sensor arrangement" refers to an arrangement of a plurality of sensors, which are combined in a common constructional unit and which may be allocated to a specific group of emitters. In the context of the present invention, a sensor is a semiconductor detector for UV radiation, i.e., for example, a silicon carbide (SiC) diode. The term "a group of emitters" refers to an arrangement of a plurality of bar-shaped low-pressure mercury UV emitters, which are located substantially parallel to one another and in one plane. The emitters in this group may preferably be electrically and/or mechanically connected to one another, so a plurality of groups forms an array.

The aforementioned object is achieved by the inventive because the sensor means comprise at least one elongate sensor arrangement, which is arranged parallel to one of the groups of emitters of the array and at a distance from the group, the sensor arrangement extending substantially transversely to the longitudinal axes of the emitters of the adjacent group, and a separate UV sensor being provided for each emitter of the group. As a result of the incorporation of a sensor arrangement into the device, a complete group of emitters may thus be monitored individually. Advantageously, the sensor arrangement is arranged in a quartz tube, as this is an established technology, in terms of UV transparency, mechanical stability and water tightness, from the field of UV emitters. In a device according to the invention, the emitters themselves are preferably arranged in the flow channel transversely to the direction of flow. These arrangements ensure effective swirling of the flowing fluid, wherein greater flow resistance builds up than in the case of emitters arranged longitudinally to the flow. The incorporation of the sensor arrangements does not substantially alter the flow characteristics. The sensor arrangements may, in particular, also be arranged in the flow channel transversely to the direction of flow, so that the electrical terminals and the mechanical mounts may be provided laterally in the flow channel.

The respective sensor arrangement preferably comprises a support plate, which supports the UV sensors. The support plate may also be a circuit board. The construction costs and the effect on the flow conditions in the device are reduced if the sensor arrangement is arranged between two emitter groups and the support plate of the sensor arrangement supports respective UV sensors, each of which faces one group, on two mutually remote flat sides. A sensor arrangement may thus support individual UV sensors for each emitter of in total two adjacent emitter groups. The incorporation of one sensor arrangement is therefore sufficient for two groups.

Each UV sensor may advantageously be provided with its own current/voltage transformer or generally with an amplifier and a digital module, wherein the sensors of a sensor arrangement communicate with the control unit via a common data bus. The amplification and conversion of the signal into a bus-capable digital signal minimizes the significant effect of the electromagnetic radiation in the radio frequency range that issues from the UV emitters that are used.

An advantageous calibration of all of the sensors is facilitated if a guide sensor, which detects the UV radiation emitted by the UV emitters and relative to which the individual sensors may be calibrated, is provided outside the sensor means. This allows all of the sensors to be calibrated, at the start of the initial operation or after a certain burn-in period, to a 100% value of the detected UV radiation.

BRIEF DESCRIPTION OF THE DRAWINGS

An embodiment of the present invention will be described below with reference to the drawings, in which.

DESCRIPTION OF SPECIFIC EMBODIMENTS

Figure 1:
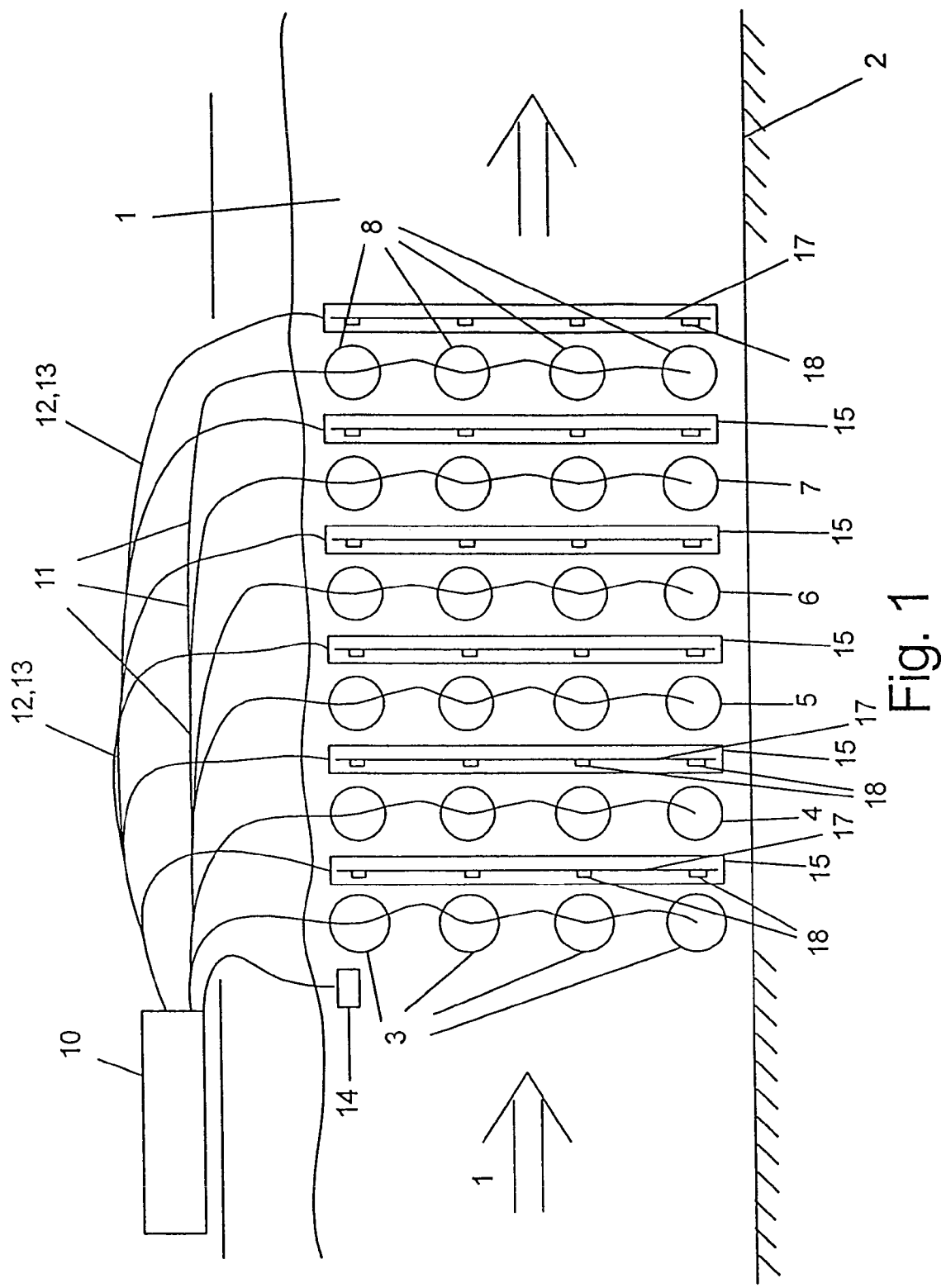
FIG. 1 shows an emitter array comprising a large number of UV emitters and associated sensor arrangements.

FIG. 1 schematically illustrates a device for the disinfection of flowing media. A waste water flow 1 is guided in a flow channel 2. A number of UV emitters 3, 4, 5, 6, 7, 8 are arranged in this flow channel. The UV emitters 3 to 8 have the construction of a low-pressure mercury emitter. They are substantially tubular and extend, in the illustration according to FIG. 1, perpendicularly to the drawing plane, i.e. transversely to the direction of flow of the waste water 1.

A control and adjustment unit 10, which is arranged outside the flow channel, provides the supply voltage, which is controlled in a manner known per se, to the UV emitters 3 to 8 via supply lines 11.

The emitters are combined in this embodiment to form groups of four emitters each, which are jointly fed via a respective cable loom and are thus mechanically grouped. However, it may also be provided that each emitter is supplied individually or that the groups are formed not in a vertical column, as in this embodiment, but rather horizontally in lines.

A sensor arrangement 15, which is fed via data lines 12, 13 and evaluated, is provided adjacent to each perpendicular group of emitters 3 to 8. A guide sensor 14 detects the overall emitted UV radiation of the emitter array 3 to 8.

Figure 2:
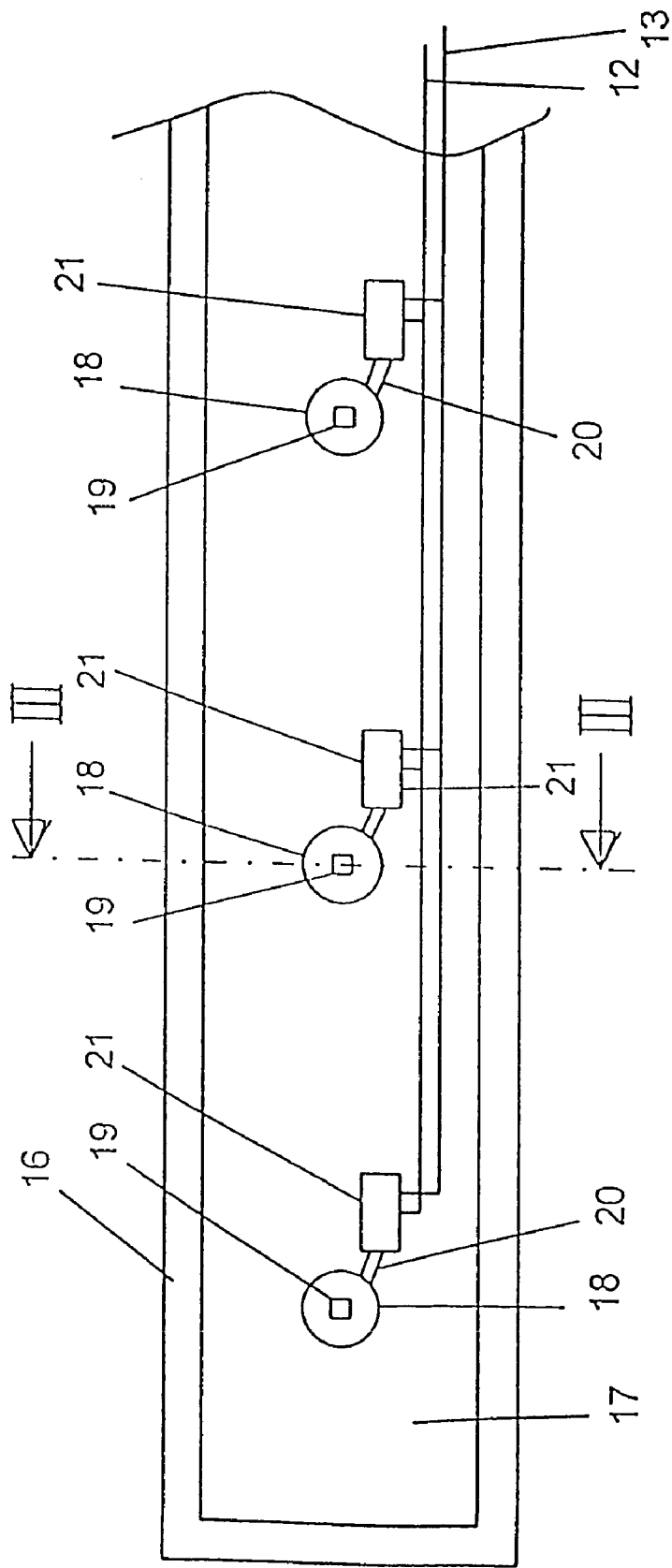
FIG. 2 is an enlarged view of a sensor arrangement according to FIG. 1.

FIG. 2 illustrates the sensor arrangement 15 in greater detail. It comprises an outer cladding tube 16 and a support plate 17, on which UV sensors 18 are arranged. Each UV sensor 18 has a UV light-sensitive region 19, which consists, in a manner known per se, of an SiC crystal. Connection lines 20 connect the UV sensor 19 to a digital module 21 arranged downstream, which contains both a current/voltage transformer and a microcontroller.

This module 21 of each UV sensor is connected to two bus or data lines 12, 13 via which the voltage is supplied and the communication with the external unit 10 is produced.

Figure 3:
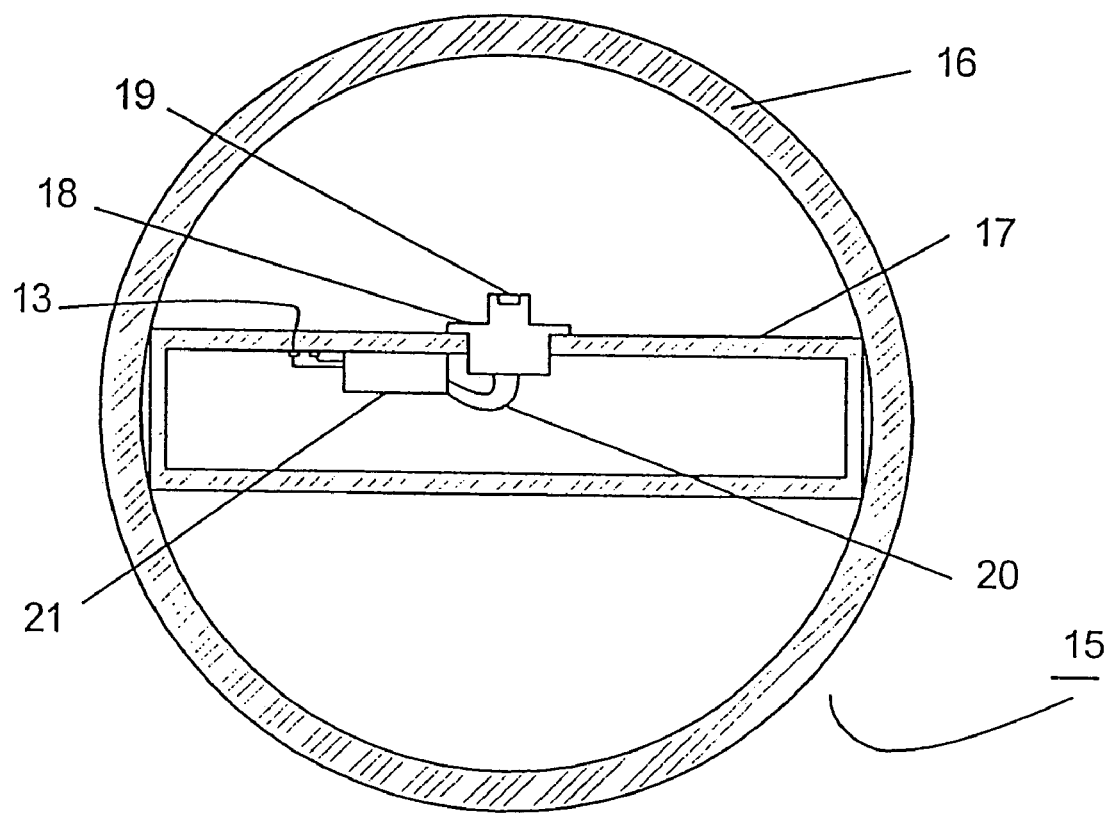
FIG. 3 is a cross section, taken along the line III-III, of a sensor arrangement according to FIG. 2.

FIG. 3 is a cross section, taken approximately along the line III-III, through the sensor arrangement from FIG. 2.

It may be seen that the cladding tube 16 has a circular section and, inside the cladding tube 16, the support plate 17 is configured as a rectangular hollow profile member. This hollow profile member supports the UV sensor 18 in such a way that the light-sensitive region 19 faces outward, while the lines 20, the digital module 21 and the bus lines 12, 13 extend within the support plate 17.

Figure 4:
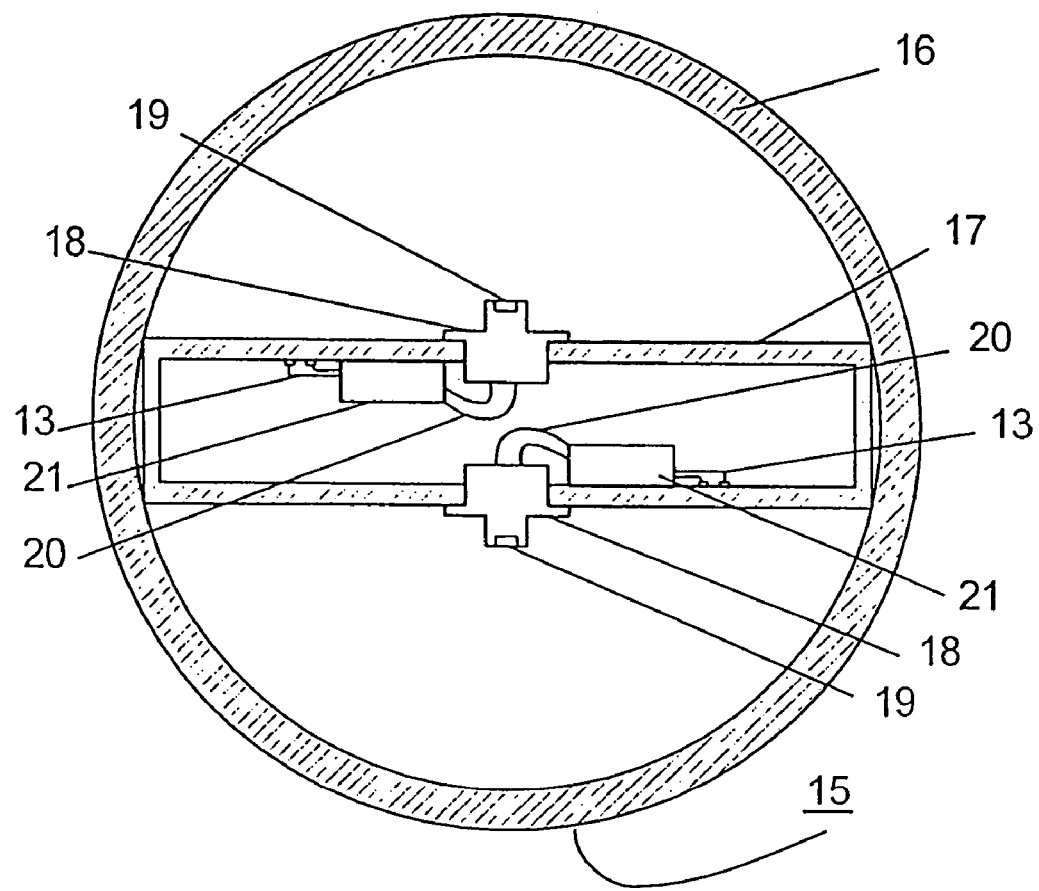
FIG. 4 is a cross section according to FIG. 3 of a sensor arrangement comprising UV sensors oriented on two sides.

FIG. 4 illustrates a further embodiment of a sensor arrangement in the context of the present invention. In this embodiment, a total of two UV sensors 18 are arranged in the region of the sectional plane III-III. The UV sensors are oriented in such a way that their two light-sensitive regions 19 diametrically oppose each other. The lines 12, 13, 20 and the digital module 21 are arranged, in each case, for both UV sensors 19 inside the support plate 17.

In practice, the above-described device operates as follows: the flowing medium is, for example, the outflow of a sewage treatment plant, i.e. waste water that has already been mechanically and biologically treated, but still contains microorganisms. The microorganisms migrate in the waste water flow 1, which proceeds in the flow channel 2, in the direction of flow, i.e. from left to right as shown in FIG. 1. The water flow passes through the emitters 3, which are arranged transversely to the direction of flow, and then through the additional emitter groups 4, 5, 6, 7 and 8 before it enters the outlet of the treatment plant. The emitters 3 to 8 are supplied by the control device 10 with operating voltage in such a way that they emit UV radiation in the relevant wavelength range (approximately 254 nm) for the disinfection of microorganisms. The intensity is selected in such a way that reliable disinfection occurs once the emitter arrangement has been passed through. The system is configured in such a way that all of the emitters 3 to 8 operate simultaneously. In the case of systems with a variable water level, it may be provided to switch off the upper line of the emitters when these become dry. This adjustment is known from the prior art.

The individual emitters are constructed in such a way that an emitter element is arranged in a cladding tube and radiates into the flow channel 2 over the entire length of the gas column emitting UV light. The construction of the emitters 3 to 8 is also known from the prior art.

A sensor arrangement 15 is arranged after each group of emitters, viewed in the direction of flow, in such a way that the regions 19 of the UV sensors 18 that are sensitive to UV light are oriented toward the respectively adjacent emitter located upstream. The individual sensor 18 therefore receives light from the emitter directly adjacent to it and is thus able to detect whether and at what radiation power the emitter is operating. As an individual UV sensor 18 is provided for each emitter, and because all of the sensors 18 communicate with the control device 10 via a bus system 12, 13, this control device contains all of the information allowing the operating state and power of each individual emitter to be checked. It may, in particular, also be determined whether the cladding tubes surrounding the individual emitter element might be clouded.

For calibrating the individual sensor elements 18, the radiation intensity is detected using the guide sensor 14, when the emitters 3 to 8 are new, and this radiation intensity is stored as a 100% value for the individual sensors 18. A deviation from this desired value may then be detected. It is possible accurately to distinguish whether all of the emitters are ageing, and the UV intensity of all of the emitters thus decreasing uniformly, or whether the emitted radiation power varies more markedly in one individual emitter than in the other emitters. The latter finding is a criterion for a possibly prematurely required exchange of the relevant emitter.

The orientation of the UV light-sensitive regions 19 toward the individual emitters also ensures that the scattered radiation of the remaining UV emitters does not cover the signal to be detected of each individual emitter. The intensity of the directly adjacent emitter is, in any case, a sufficiently large proportion of the total signal. The precise proportion may be determined by means of suitable programming of the control unit 10 in that, for example when all of the emitters 3 to 8 are in operation, an individual emitter is switched off and the variation in the UV intensity or the signal issued by the sensor 18 is determined for this emitter. This process may be repeated for all of the emitters 3 to 8.

A simplified arrangement is obtained if the sensor arrangement according to FIG. 4, which is sensitive on both sides, is used. A sensor arrangement of this type is then able to monitor two groups of emitters simultaneously. It is then, for example, possible to monitor the rows 3 and 4 using one sensor arrangement, the rows 5 and 6 using a second sensor arrangement, and the rows 7 and 8 using a third sensor arrangement, so a total of three sensor arrangements are required, instead of the six sensor arrangements according to FIG. 1.

The sensor arrangements, as illustrated in FIGS. 2, 3 and 4, have a hollow profile-like support plate 17. This hollow profile member may be made from a metallic material (for example, aluminum). This material has the advantage that the interior, with the lines 12, 13 and 20 arranged therein and with the digital module 21, is shielded from electromagnetic environmental radiation in the radio frequency range. It is precisely these emissions in the radio frequency range that are significant in relatively large UV disinfection systems and cause undesirable electronic effects on the sensor arrangements. The signal processing is also facilitated and improved as a result of the fact that the output signal of the UV sensors 18 is already in digitized form in immediate proximity to the respective sensor.

It will also be apparent that the relative arrangement in FIG. 1 is only one embodiment. It would equally be possible to provide the respective sensor arrangements 15 with six UV sensors 18 each and then to arrange the sensor arrangements horizontally between two lines of emitters. The sensor arrangements may also be arranged at any locations perpendicularly to the drawing plane of FIG. 1.

The specification incorporates by reference the disclosure of German priority document 103 37 379.9 filed Aug. 13, 2003 and PCT/EP2004/007022 filed Jun. 29, 2004.

The present invention is, of course, in no way restricted to the specific disclosure of the specification and drawings, but also encompasses any modifications within the scope of the appended claims.

The invention claimed is:

1. A device for the UV treatment of fluids flowing in a single flow channel, comprising:
    a plurality of cylindrical low-pressure mercury UV emitters that are arranged in groups in said single flow channel, wherein longitudinal axes of said UV emitters are disposed substantially parallel to one another and transverse to the flow of fluid in said single flow channel such that the UV emitters of a given group are disposed in a plane and the direction of the flow of fluid in said single flow channel is entirely transverse to the UV emitters;
    at least one elongated sensor arrangement also arranged in said single flow channel and adapted to monitor an operating state of said UV emitters, wherein said at least one elongated sensor arrangement is spaced from and parallel to one of said groups of said UV emitters, wherein said at least one elongated sensor arrangement extends substantially transverse to said longitudinal axes of said UV emitters of the adjacent group, and wherein said at least one elongated sensor arrangement is provided with a separate UV sensor for each UV emitter of that group; and
    at least one unit connected with said at least one elongated sensor arrangement and adapted to control and/or regulate said UV emitters.

2. A device according to claim 1, wherein said at least one elongated sensor arrangement is disposed in a quartz tube.

3. A device according to claim 2, wherein said quartz tube contains a plurality of said UV sensors.

4. A device according to claim 1, wherein said at least one elongated sensor arrangement is disposed transverse to a direction of flow of said fluids in said flow channel.

5. A device according to claim 1, wherein said at least one elongated sensor arrangement is provided with a support plate that carries said UV sensors.

6. A device according to claim 5, wherein said at least one elongated arrangement is disposed between two groups of said UV emitters, wherein said support plate carries said UV sensors on two oppositely facing flat sides thereof, and wherein said UV sensors of a given flat side of said support plate face a respective one of said groups of UV emitters.

7. A device according to claim 1, wherein each of said UV sensors is provided with a current/voltage transformer and a digital module, and wherein said UV sensors of said at least one elongated sensor arrangement communicate with said at least one unit via a common data bus.

8. A device according to claim 1, wherein at least one guide sensor is disposed externally of said at least one elongated sensor arrangement, and wherein said at least one guide sensor detects UV radiation emitted by said UV emitters, relative to which radiation individual ones of said UV sensors are adapted to be calibrated.

\* \* \* \* \*